US006928207B1

(12) United States Patent
Trisnadi et al.

(10) Patent No.: US 6,928,207 B1
(45) Date of Patent: Aug. 9, 2005

(54) APPARATUS FOR SELECTIVELY BLOCKING WDM CHANNELS

(75) Inventors: Jahja I. Trisnadi, Cupertino, CA (US); Clinton B. Carlisle, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 235 days.

(21) Appl. No.: 10/318,658

(22) Filed: Dec. 12, 2002

(51) Int. Cl.$^7$ .............................. G02B 6/35; G02B 6/34; G02B 26/08
(52) U.S. Cl. .............................. 385/16; 385/24; 385/37; 359/302
(58) Field of Search .............................. 385/16, 18–24, 385/31, 37, 47; 359/237–324; 398/48, 82–84, 118–121

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai ........................ 178/5.4 |
| 2,783,406 A | 2/1957 | Vanderhooft .................. 313/70 |
| 2,920,529 A | 1/1960 | Blythe ............................ 88/73 |
| 2,991,690 A | 7/1961 | Grey et al. ................... 88/16.6 |
| RE25,169 E | 5/1962 | Glenn |
| 3,256,465 A | 6/1966 | Weissenstern et al. ...... 317/101 |

(Continued)

FOREIGN PATENT DOCUMENTS

| | | | |
|---|---|---|---|
| DE | d. 32 33 195 A1 | 3/1983 | ........... H01L/23/52 |
| DE | d. 43 23 799 A1 | 1/1994 | ........... H01L/23/50 |

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Michelle R. Connelly-Cushwa
(74) *Attorney, Agent, or Firm*—Okamoto & Benedicto LLP

(57) ABSTRACT

An apparatus for selective blocking WDM channels comprises a light modulator, a diffraction grating, and a transform lens. The light modulator comprises an array of pixels. Each pixel of the light modulator is selectively operable to direct light into a first mode and a second mode. The first mode directs the light to an output. The second mode directs the light away from the output. The diffraction grating is operable to receive the WDM channels from an input and to disperse the WDM channels into a range of angles. The transform lens couples the diffraction grating to the light modulator. The diffraction grating is operable to transform the range of angles of the WDM channels into a range of spatially distinct positions along the array of pixels of the light modulator without overlap of two of the WDM channels on an individual pixel. In operation, the light modulator directs at least one of the WDM channels into the second mode while directing a remainder of the WDM channels into the first mode. The light modulator is capable of operating with a large dynamic range, thereby enabling equalization of select, transmitted WDM channels as well as blocking any arbitrary channels over the spectral range of operation.

9 Claims, 7 Drawing Sheets

U.S. PATENT DOCUMENTS

| | | |
|---|---|---|
| 3,388,301 A | 6/1968 | James .................... 317/234 |
| 3,443,871 A | 5/1969 | Chitayat .................. 356/106 |
| 3,553,364 A | 1/1971 | Lee ........................ 178/7.3 |
| 3,576,394 A | 4/1971 | Lee ........................ 178/7.3 |
| 3,600,798 A | 8/1971 | Lee ......................... 29/592 |
| 3,656,837 A | 4/1972 | Sandbank ................ 350/161 |
| 3,657,610 A | 4/1972 | Yamamoto et al. ...... 317/243 |
| 3,693,239 A | 9/1972 | Dix .......................... 29/470 |
| 3,743,507 A | 7/1973 | Ih et al. ..................... 96/81 |
| 3,752,563 A | 8/1973 | Torok et al. .............. 350/151 |
| 3,781,465 A | 12/1973 | Ernstoff et al. ......... 178/5.4 BD |
| 3,783,184 A | 1/1974 | Ernstoff et al. ......... 178/5.4 BD |
| 3,792,916 A | 2/1974 | Sarna ...................... 350/163 |
| 3,802,769 A | 4/1974 | Rotz et al. ................. 352/43 |
| 3,811,186 A | 5/1974 | Larnerd et al. ............. 29/626 |
| 3,861,784 A | 1/1975 | Torok .................... 350/162 R |
| 3,862,360 A | 1/1975 | Dill et al. ............... 178/7.3 D |
| 3,871,014 A | 3/1975 | King et al. ................. 357/67 |
| 3,886,310 A | 5/1975 | Guldberg et al. ....... 178/7.5 D |
| 3,896,338 A | 7/1975 | Nathanson et al. ...... 315/373 |
| 3,915,548 A | 10/1975 | Opittek ..................... 350/3.5 |
| 3,935,499 A | 1/1976 | Oess ....................... 313/413 |
| 3,935,500 A | 1/1976 | Oess et al. ............... 313/495 |
| 3,938,881 A | 2/1976 | Biegelsen et al. ........ 350/161 |
| 3,941,456 A | 3/1976 | Schilz et al. .............. 350/161 |
| 3,942,245 A | 3/1976 | Jackson et al. ............. 29/591 |
| 3,943,281 A | 3/1976 | Keller et al. ............ 178/7.5 D |
| 3,947,105 A | 3/1976 | Smith ...................... 353/121 |
| 3,969,611 A | 7/1976 | Fonteneau ................ 219/502 |
| 3,980,476 A | 9/1976 | Wysocki ..................... 96/1.1 |
| 3,991,416 A | 11/1976 | Byles et al. ............ 340/324 R |
| 4,001,663 A | 1/1977 | Bray .......................... 321/2 |
| 4,004,849 A | 1/1977 | Shattuck ................ 350/160 R |
| 4,006,968 A | 2/1977 | Ernstoff et al. ........ 350/160 LC |
| 4,009,939 A | 3/1977 | Okano .................. 350/162 SF |
| 4,011,009 A | 3/1977 | Lama et al. ............. 350/162 R |
| 4,012,116 A | 3/1977 | Yevick ..................... 350/132 |
| 4,012,835 A | 3/1977 | Wallick ..................... 29/591 |
| 4,017,158 A | 4/1977 | Booth ................... 350/162 SF |
| 4,020,381 A | 4/1977 | Oess et al. ............... 313/302 |
| 4,021,766 A | 5/1977 | Aine ......................... 338/2 |
| 4,034,211 A | 7/1977 | Horst et al. .......... 235/61.12 N |
| 4,034,399 A | 7/1977 | Drukier et al. .............. 357/68 |
| 4,035,068 A | 7/1977 | Rawson .................... 353/122 |
| 4,067,129 A | 1/1978 | Abramson et al. ........... 40/563 |
| 4,084,437 A | 4/1978 | Finnegan .................... 73/361 |
| 4,090,219 A | 5/1978 | Ernstoff et al. .............. 358/59 |
| 4,093,346 A | 6/1978 | Nishino et al. ......... 350/162 SF |
| 4,093,921 A | 6/1978 | Buss ....................... 325/459 |
| 4,093,922 A | 6/1978 | Buss ....................... 325/459 |
| 4,100,579 A | 7/1978 | Ernstoff .................... 358/230 |
| 4,103,273 A | 7/1978 | Keller ......................... 338/2 |
| 4,126,380 A | 11/1978 | Borm ....................... 350/266 |
| 4,127,322 A | 11/1978 | Jacobson et al. ............ 353/31 |
| 4,135,502 A | 1/1979 | Peck ....................... 128/76.5 |
| 4,139,257 A | 2/1979 | Matsumoto ................ 350/6.1 |
| 4,143,943 A | 3/1979 | Rawson .................... 350/120 |
| 4,163,570 A | 8/1979 | Greenaway ................ 283/8 A |
| 4,184,700 A | 1/1980 | Greenaway ................... 283/6 |
| 4,185,891 A | 1/1980 | Kaestner ................... 350/167 |
| 4,190,855 A | 2/1980 | Inoue ........................ 357/80 |
| 4,195,915 A | 4/1980 | Lichty et al. .............. 350/345 |
| 4,205,428 A | 6/1980 | Ernstoff et al. ........... 29/592 R |
| 4,211,918 A | 7/1980 | Nyfeler et al. ............. 235/454 |
| 4,223,050 A | 9/1980 | Nyfeler et al. ............. 427/163 |
| 4,225,913 A | 9/1980 | Bray ........................ 363/97 |
| 4,249,796 A | 2/1981 | Sincerbox et al. ......... 350/370 |
| 4,250,217 A | 2/1981 | Greenaway ................ 428/161 |
| 4,250,393 A | 2/1981 | Greenaway ................ 250/566 |
| 4,256,787 A | 3/1981 | Shaver et al. ................ 428/1 |
| 4,257,016 A | 3/1981 | Kramer, Jr. et al. ....... 322/7.51 |
| 4,290,672 A | 9/1981 | Whitefield ................ 350/358 |
| 4,295,145 A | 10/1981 | Latta ....................... 346/108 |
| 4,311,999 A | 1/1982 | Upton et al. ............... 340/755 |
| 4,327,411 A | 4/1982 | Turner ...................... 364/900 |
| 4,327,966 A | 5/1982 | Bloom ................... 350/162 R |
| 4,331,972 A | 5/1982 | Rajchman .................. 358/60 |
| 4,336,982 A | 6/1982 | Rector, Jr. ................. 350/358 |
| 4,338,660 A | 7/1982 | Kelley et al. .............. 364/200 |
| 4,343,535 A | 8/1982 | Bleha, Jr. .................. 350/342 |
| 4,346,965 A | 8/1982 | Sprague et al. ............. 350/358 |
| 4,348,079 A | 9/1982 | Johnson ................... 350/358 |
| 4,355,463 A | 10/1982 | Burns ....................... 29/827 |
| 4,361,384 A | 11/1982 | Bosserman ................ 350/174 |
| 4,369,524 A | 1/1983 | Rawson et al. ............. 455/606 |
| 4,374,397 A | 2/1983 | Mir .......................... 358/75 |
| 4,389,096 A | 6/1983 | Hori et al. ............... 350/339 R |
| 4,391,490 A | 7/1983 | Hartke ..................... 350/356 |
| 4,396,246 A | 8/1983 | Holman .................. 350/96.14 |
| 4,398,798 A | 8/1983 | Krawczak et al. ...... 350/162.24 |
| 4,400,740 A | 8/1983 | Traino et al. .............. 358/293 |
| 4,408,884 A | 10/1983 | Kleinknecht et al. ....... 356/355 |
| 4,414,583 A | 11/1983 | Hooker, III ............... 358/300 |
| 4,417,386 A | 11/1983 | Exner ........................ 29/590 |
| 4,418,397 A | 11/1983 | Brantingham et al. ...... 364/900 |
| 4,420,717 A | 12/1983 | Wallace et al. ............. 318/696 |
| 4,422,099 A | 12/1983 | Wolfe ....................... 358/293 |
| 4,426,768 A | 1/1984 | Black et al. ................. 29/583 |
| 4,430,584 A | 2/1984 | Someshwar et al. ........ 307/465 |
| 4,435,041 A | 3/1984 | Torok et al. ........... 350/162.24 |
| 4,440,839 A | 4/1984 | Mottier ........................ 430/2 |
| 4,443,819 A | 4/1984 | Funada et al. ............. 358/236 |
| 4,443,845 A | 4/1984 | Hamilton et al. ........... 364/200 |
| 4,447,881 A | 5/1984 | Brantingham et al. ...... 364/488 |
| 4,454,591 A | 6/1984 | Lou ......................... 364/900 |
| 4,456,338 A | 6/1984 | Gelbart ..................... 350/358 |
| 4,460,907 A | 7/1984 | Nelson .................... 346/153.1 |
| 4,462,046 A | 7/1984 | Spight ...................... 358/101 |
| 4,467,342 A | 8/1984 | Tower ....................... 357/30 |
| 4,468,725 A | 8/1984 | Venturini ................... 363/160 |
| 4,483,596 A | 11/1984 | Marshall ................... 350/385 |
| 4,484,188 A | 11/1984 | Ott .......................... 340/728 |
| 4,487,677 A | 12/1984 | Murphy .................... 204/247 |
| 4,492,435 A | 1/1985 | Banton et al. .............. 350/360 |
| 4,503,494 A | 3/1985 | Hamilton et al. ........... 364/200 |
| 4,511,220 A | 4/1985 | Scully ...................... 350/403 |
| 4,538,883 A | 9/1985 | Sprague et al. ............. 350/356 |
| 4,545,610 A | 10/1985 | Lakritz et al. ............... 29/589 |
| 4,556,378 A | 12/1985 | Nyfeler et al. ............. 425/143 |
| 4,558,171 A | 12/1985 | Gantley et al. ........... 174/52 FP |
| 4,561,011 A | 12/1985 | Kohara et al. |
| 4,561,044 A | 12/1985 | Ogura et al. ................ 362/84 |
| 4,566,935 A | 1/1986 | Hornbeck .................. 156/626 |
| 4,567,585 A | 1/1986 | Gelbart ...................... 369/97 |
| 4,571,041 A | 2/1986 | Gaudyn ..................... 353/10 |
| 4,571,603 A | 2/1986 | Hornbeck et al. .......... 346/160 |
| 4,577,932 A | 3/1986 | Gelbart ..................... 350/358 |
| 4,577,933 A | 3/1986 | Yip et al. ................... 350/358 |
| 4,588,957 A | 5/1986 | Balant et al. ................ 330/4.3 |
| 4,590,548 A | 5/1986 | Maytum .................... 363/161 |
| 4,594,501 A | 6/1986 | Culley et al. ............... 219/492 |
| 4,596,992 A | 6/1986 | Hornbeck ............... 346/76 PH |
| 4,615,595 A | 10/1986 | Hornbeck .................. 353/122 |
| 4,623,219 A | 11/1986 | Trias ....................... 350/351 |
| 4,636,039 A | 1/1987 | Turner ...................... 350/356 |
| 4,636,866 A | 1/1987 | Hattori ..................... 358/236 |
| 4,641,193 A | 2/1987 | Glenn ...................... 358/233 |
| 4,645,881 A | 2/1987 | LeToumelin et al. ....... 379/252 |
| 4,646,158 A | 2/1987 | Ohno et al. ................ 358/236 |
| 4,649,085 A | 3/1987 | Landram ................... 428/620 |
| 4,649,432 A | 3/1987 | Watanabe .................. 358/241 |

| Patent No. | Date | Inventor | Class |
|---|---|---|---|
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,193 A | * 12/1990 | Tomita | 385/55 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunnaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |

| | | | |
|---|---|---|---|
| 5,149,405 A | 9/1992 | Bruns et al. ............. 204/129.1 |
| 5,150,205 A | 9/1992 | Um et al. ..................... 358/60 |
| 5,151,718 A | 9/1992 | Nelson ...................... 346/160 |
| 5,151,724 A | 9/1992 | Kikinis ........................ 357/17 |
| 5,151,763 A | 9/1992 | Marek et al. ................ 357/26 |
| 5,153,770 A | 10/1992 | Harris ......................... 359/245 |
| 5,155,604 A | 10/1992 | Miekka et al. ................. 359/2 |
| 5,155,615 A | 10/1992 | Tagawa ...................... 359/213 |
| 5,155,778 A | 10/1992 | Magel et al. ................ 385/18 |
| 5,155,812 A | 10/1992 | Ehlig et al. ................ 395/275 |
| 5,157,304 A | 10/1992 | Kane et al. ................ 313/495 |
| 5,159,485 A | 10/1992 | Nelson ...................... 359/291 |
| 5,161,042 A | 11/1992 | Hamada ..................... 359/41 |
| 5,162,787 A | 11/1992 | Thompson et al. ......... 340/794 |
| 5,164,019 A | 11/1992 | Sinton ........................ 136/249 |
| 5,165,013 A | 11/1992 | Faris ........................... 395/104 |
| 5,168,401 A | 12/1992 | Endriz ........................ 359/625 |
| 5,168,406 A | 12/1992 | Nelson ....................... 359/855 |
| 5,170,156 A | 12/1992 | DeMond et al. ............ 340/794 |
| 5,170,269 A | 12/1992 | Lin et al. ........................ 359/9 |
| 5,170,283 A | 12/1992 | O'Brien et al. ............. 359/291 |
| 5,172,161 A | 12/1992 | Nelson ....................... 355/200 |
| 5,172,262 A | 12/1992 | Hornbeck ................... 359/223 |
| 5,177,724 A | 1/1993 | Gelbart .................... 369/44.16 |
| 5,178,728 A | 1/1993 | Boysel et al. ............... 156/656 |
| 5,179,274 A | 1/1993 | Sampsell ................. 250/208.2 |
| 5,179,367 A | 1/1993 | Shimizu ..................... 340/700 |
| 5,181,231 A | 1/1993 | Parikh et al. ................ 377/26 |
| 5,182,665 A | 1/1993 | O'Callaghan et al. ........ 359/95 |
| 5,185,660 A | 2/1993 | Um ............................. 358/60 |
| 5,185,823 A | 2/1993 | Kaku et al. |
| 5,188,280 A | 2/1993 | Nakao et al. ............... 228/123 |
| 5,189,404 A | 2/1993 | Masimo et al. ............. 340/720 |
| 5,189,505 A | 2/1993 | Bartelink ................... 257/419 |
| 5,191,405 A | 3/1993 | Tomita et al. .............. 257/777 |
| 5,192,864 A | 3/1993 | McEwen et al. ............ 250/234 |
| 5,192,946 A | 3/1993 | Thompson et al. ......... 340/794 |
| 5,198,895 A | 3/1993 | Vick ........................... 358/103 |
| D334,557 S | 4/1993 | Hunter et al. .............. D14/114 |
| D334,742 S | 4/1993 | Hunter et al. .............. D14/113 |
| 5,202,785 A | 4/1993 | Nelson ....................... 359/214 |
| 5,206,629 A | 4/1993 | DeMond et al. ............ 340/719 |
| 5,206,829 A | 4/1993 | Thakoor et al. |
| 5,208,818 A | 5/1993 | Gelbart et al. ................ 372/30 |
| 5,208,891 A | 5/1993 | Prysner ...................... 385/116 |
| 5,210,637 A | 5/1993 | Puzey ......................... 359/263 |
| 5,212,115 A | 5/1993 | Cho et al. ................... 437/208 |
| 5,212,555 A | 5/1993 | Stoltz ......................... 358/206 |
| 5,212,582 A | 5/1993 | Nelson ....................... 359/224 |
| 5,214,308 A | 5/1993 | Nishiguchi et al. ......... 257/692 |
| 5,214,419 A | 5/1993 | DeMond et al. ............ 340/794 |
| 5,214,420 A | 5/1993 | Thompson et al. ......... 340/795 |
| 5,216,278 A | 6/1993 | Lin et al. |
| 5,216,537 A | 6/1993 | Hornbeck ................... 359/291 |
| 5,216,544 A | 6/1993 | Horikawa et al. ........... 359/622 |
| 5,219,794 A | 6/1993 | Satoh et al. ................. 437/209 |
| 5,220,200 A | 6/1993 | Blanton ...................... 257/778 |
| 5,221,400 A | 6/1993 | Staller et al. ................ 156/292 |
| 5,221,982 A | 6/1993 | Faris ............................. 359/93 |
| 5,224,088 A | 6/1993 | Atiya ........................... 369/97 |
| D337,320 S | 7/1993 | Hunter et al. .............. D14/113 |
| 5,226,099 A | 7/1993 | Mignardi et al. ............. 385/19 |
| 5,229,597 A | 7/1993 | Fukatsu |
| 5,230,005 A | 7/1993 | Rubino et al. ................. 372/20 |
| 5,231,363 A | 7/1993 | Sano et al. ................... 332/109 |
| 5,231,388 A | 7/1993 | Stoltz ......................... 340/783 |
| 5,231,432 A | 7/1993 | Glenn ......................... 353/31 |
| 5,233,456 A | 8/1993 | Nelson ....................... 359/214 |
| 5,233,460 A | 8/1993 | Partlo et al. ................ 359/247 |
| 5,233,874 A | 8/1993 | Putty et al. ............. 73/517 AV |
| 5,237,340 A | 8/1993 | Nelson ....................... 346/108 |
| 5,237,435 A | 8/1993 | Kurematsu et al. ........... 359/41 |
| 5,239,448 A | 8/1993 | Perkins et al. ............... 361/764 |
| 5,239,806 A | 8/1993 | Maslakow .................... 53/432 |
| 5,240,818 A | 8/1993 | Mignardi et al. ............ 430/321 |
| 5,245,686 A | 9/1993 | Faris et al. .................. 385/120 |
| 5,247,180 A | 9/1993 | Mitcham et al. .......... 250/492.1 |
| 5,247,593 A | 9/1993 | Lin et al. ...................... 385/17 |
| 5,249,245 A | 9/1993 | Lebby et al. .................. 385/89 |
| 5,251,057 A | 10/1993 | Guerin et al. ................ 359/249 |
| 5,251,058 A | 10/1993 | MacArthur .................. 359/249 |
| 5,254,980 A | 10/1993 | Hendrix et al. ................ 345/84 |
| 5,255,100 A | 10/1993 | Urbanus ..................... 358/231 |
| 5,256,869 A | 10/1993 | Lin et al. .................. 250/201.9 |
| 5,258,325 A | 11/1993 | Spitzer et al. ................. 437/86 |
| 5,260,718 A | 11/1993 | Rommelmann et al. 346/107 R |
| 5,260,798 A | 11/1993 | Um et al. .................... 358/233 |
| 5,262,000 A | 11/1993 | Welbourn et al. ........... 156/643 |
| 5,272,473 A | 12/1993 | Thompson et al. .............. 345/7 |
| 5,278,652 A | 1/1994 | Urbanus et al. ............. 358/160 |
| 5,278,925 A | 1/1994 | Boysel et al. ................. 385/14 |
| 5,280,277 A | 1/1994 | Hornbeck ................... 345/108 |
| 5,281,887 A | 1/1994 | Engle ......................... 310/335 |
| 5,281,957 A | 1/1994 | Schoolman ..................... 345/8 |
| 5,285,105 A | 2/1994 | Cain ........................... 257/672 |
| 5,285,196 A | 2/1994 | Gale, Jr. ..................... 345/108 |
| 5,285,407 A | 2/1994 | Gale et al. ............. 365/189.11 |
| 5,287,096 A | 2/1994 | Thompson et al. ......... 345/147 |
| 5,287,215 A | 2/1994 | Warde et al. ................ 359/293 |
| 5,289,172 A | 2/1994 | Gale, Jr. et al. ............. 345/108 |
| 5,291,317 A | 3/1994 | Newswanger ................ 359/15 |
| 5,291,473 A | 3/1994 | Pauli ........................... 369/112 |
| 5,293,511 A | 3/1994 | Poradish et al. ............ 257/434 |
| 5,296,408 A | 3/1994 | Wilbarg et al. ............. 437/203 |
| 5,296,891 A | 3/1994 | Vogt et al. ..................... 355/67 |
| 5,296,950 A | 3/1994 | Lin et al. ........................ 359/9 |
| 5,298,460 A | 3/1994 | Nishiguchi et al. ......... 437/183 |
| 5,299,037 A | 3/1994 | Sakata .......................... 359/41 |
| 5,299,289 A | 3/1994 | Omae et al. ................... 359/95 |
| 5,300,813 A | 4/1994 | Joshi et al. .................. 257/752 |
| 5,301,062 A | 4/1994 | Takahashi et al. ........... 359/567 |
| 5,303,043 A | 4/1994 | Glenn ........................... 348/40 |
| 5,303,055 A | 4/1994 | Hendrix et al. ............. 348/761 |
| 5,307,056 A | 4/1994 | Urbanus ..................... 340/189 |
| 5,307,185 A | 4/1994 | Jones et al. ................... 359/41 |
| 5,310,624 A | 5/1994 | Ehrlich ....................... 430/322 |
| 5,311,349 A | 5/1994 | Anderson et al. ........... 359/223 |
| 5,311,360 A | 5/1994 | Bloom et al. ............... 359/572 |
| 5,312,513 A | 5/1994 | Florence et al. ............. 156/643 |
| 5,313,479 A | 5/1994 | Florence ...................... 372/26 |
| 5,313,648 A | 5/1994 | Ehlig et al. ................. 395/800 |
| 5,313,835 A | 5/1994 | Dunn ........................... 73/505 |
| 5,315,418 A | 5/1994 | Sprague et al. ................ 359/41 |
| 5,315,423 A | 5/1994 | Hong ......................... 359/124 |
| 5,315,429 A | 5/1994 | Abramov |
| 5,319,214 A | 6/1994 | Gregory et al. .......... 250/504 R |
| 5,319,668 A | 6/1994 | Luecke ....................... 372/107 |
| 5,319,789 A | 6/1994 | Ehlig et al. ................. 395/800 |
| 5,319,792 A | 6/1994 | Ehlig et al. ................. 395/800 |
| 5,320,709 A | 6/1994 | Bowden et al. |
| 5,321,416 A | 6/1994 | Bassett et al. ................... 345/8 |
| 5,323,002 A | 6/1994 | Sampsell et al. ......... 250/252.1 |
| 5,323,051 A | 6/1994 | Adams et al. ............... 257/417 |
| 5,325,116 A | 6/1994 | Sampsell ..................... 346/108 |
| 5,327,286 A | 7/1994 | Sampsell et al. ............ 359/561 |
| 5,329,289 A | 7/1994 | Sakamoto et al. ........... 345/126 |
| 5,330,301 A | 7/1994 | Brancher .................... 414/417 |
| 5,330,878 A | 7/1994 | Nelson ....................... 430/311 |
| 5,331,454 A | 7/1994 | Hornbeck ................... 359/224 |
| 5,334,991 A | 8/1994 | Wells et al. ..................... 345/8 |
| 5,339,116 A | 8/1994 | Urbanus et al. ............. 348/716 |
| 5,339,177 A | 8/1994 | Jenkins et al. ................ 359/35 |

| Patent No. | Date | Inventor | Class |
|---|---|---|---|
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | D'Hont et al. | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,370,742 A | 12/1994 | Mitchell et al. | 134/10 |
| 5,371,543 A | 12/1994 | Anderson | 348/270 |
| 5,371,618 A | 12/1994 | Tai et al. | 359/53 |
| 5,377,705 A | 1/1995 | Smith, Jr. et al. | 134/95.3 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |

| Patent | Date | Inventor | Class |
|---|---|---|---|
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,526,834 A | 6/1996 | Mielnik et al. | 134/105 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,770,473 A | 6/1998 | Green et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A | 11/1998 | Komatsu et al. | |
| 5,844,711 A | 12/1998 | Long, Jr. | |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |

| | | | |
|---|---|---|---|
| 6,210,988 B1 | 4/2001 | Howe et al. ............... 438/50 |
| 6,215,579 B1 | 4/2001 | Bloom et al. ............ 359/298 |
| 6,219,015 B1 | 4/2001 | Bloom et al. ............. 345/87 |
| 6,222,954 B1 | 4/2001 | Riza ........................ 385/18 |
| 6,229,650 B1 | 5/2001 | Reznichenko et al. ..... 359/566 |
| 6,229,683 B1 | 5/2001 | Goodwin-Johansson .... 361/233 |
| 6,241,143 B1 | 6/2001 | Kuroda ................. 228/110.1 |
| 6,249,381 B1 | 6/2001 | Suganuma |
| 6,251,842 B1 | 6/2001 | Gudeman ................ 508/577 |
| 6,252,697 B1 | 6/2001 | Hawkins et al. .......... 359/290 |
| 6,254,792 B1 | 7/2001 | Van Buskirk et al. ...... 216/13 |
| 6,261,494 B1 | 7/2001 | Zavracky et al. ......... 264/104 |
| 6,268,952 B1 | 7/2001 | Godil et al. ............. 359/291 |
| 6,271,145 B1 | 8/2001 | Toda ...................... 438/706 |
| 6,271,808 B1 | 8/2001 | Corbin ....................... 345/7 |
| 6,274,469 B1 | 8/2001 | Yu ......................... 438/592 |
| 6,282,213 B1 | 8/2001 | Gutin et al. |
| 6,286,231 B1 | 9/2001 | Bergman et al. ........... 34/410 |
| 6,290,859 B1 | 9/2001 | Fleming et al. ............. 216/2 |
| 6,290,864 B1 | 9/2001 | Patel et al. ................ 216/79 |
| 6,300,148 B1 | 10/2001 | Birdsley et al. ............ 438/15 |
| 6,303,986 B1 | 10/2001 | Shook ..................... 257/680 |
| 6,310,018 B1 | 10/2001 | Behr et al. ............... 510/175 |
| 6,313,901 B1 | 11/2001 | Cacharelis |
| 6,323,984 B1 | 11/2001 | Trisnadi ................... 359/245 |
| 6,327,071 B1 | 12/2001 | Kimura ................... 359/291 |
| 6,342,960 B1 | 1/2002 | McCullough ............ 359/124 |
| 6,346,430 B1 | 2/2002 | Raj et al. |
| 6,356,577 B1 | 3/2002 | Miller ..................... 372/107 |
| 6,356,689 B1 | 3/2002 | Greywall .................. 385/52 |
| 6,359,333 B1 | 3/2002 | Wood et al. ............. 257/704 |
| 6,384,959 B1 | 5/2002 | Furlani et al. ............ 359/291 |
| 6,387,723 B1 | 5/2002 | Payne et al. ............... 438/48 |
| 6,392,309 B1 | 5/2002 | Wataya et al. ............ 257/796 |
| 6,396,789 B1 | 5/2002 | Guerra et al. ............ 369/112 |
| 6,418,152 B1 | 7/2002 | Davis |
| 6,421,179 B1 | 7/2002 | Gutin et al. ............. 359/572 |
| 6,438,954 B1 | 8/2002 | Goetz et al. |
| 6,445,502 B1 | 9/2002 | Islam et al. .............. 359/571 |
| 6,452,260 B1 | 9/2002 | Corbin et al. ............ 257/686 |
| 6,466,354 B1 | 10/2002 | Gudeman ................ 359/247 |
| 6,479,811 B1 | 11/2002 | Kruschwitz et al. |
| 6,480,634 B1 | 11/2002 | Corrigan .................... 385/4 |
| 6,497,490 B1 | 12/2002 | Miller ..................... 359/614 |
| 6,512,868 B1 * | 1/2003 | Foster et al. ............... 385/33 |
| 6,525,863 B1 | 2/2003 | Riza ....................... 359/290 |
| 6,563,974 B2 | 5/2003 | Riza ........................ 385/18 |
| 6,565,222 B1 | 5/2003 | Ishii et al. ................ 359/883 |
| 6,569,717 B1 | 5/2003 | Murade |
| 2001/0019454 A1 | 9/2001 | Tadic-Galeb et al. ....... 359/649 |
| 2002/0015230 A1 | 2/2002 | Pilossof et al. ............ 359/558 |
| 2002/0021485 A1 | 2/2002 | Pilossof ................... 359/295 |
| 2002/0079432 A1 | 6/2002 | Lee et al. ................. 250/216 |
| 2002/0105725 A1 | 8/2002 | Sweatt et al. ............ 359/566 |
| 2002/0112746 A1 | 8/2002 | DeYoung et al. ........... 134/36 |
| 2002/0131228 A1 | 9/2002 | Potter |
| 2002/0131230 A1 | 9/2002 | Potter ...................... 361/277 |
| 2002/0135708 A1 | 9/2002 | Murden et al. |
| 2002/0176149 A1 * | 11/2002 | Davis et al. .............. 359/290 |
| 2002/0176151 A1 | 11/2002 | Moon et al. |
| 2002/0195418 A1 | 12/2002 | Kowarz et al. |
| 2002/0196492 A1 | 12/2002 | Trisnadi et al. |
| 2003/0056078 A1 | 3/2003 | Johansson et al. |
| 2003/0174939 A1 * | 9/2003 | Moon et al. ............... 385/27 |
| 2003/0184843 A1 * | 10/2003 | Moon et al. .............. 359/290 |

FOREIGN PATENT DOCUMENTS

| | | | |
|---|---|---|---|
| DE | d. 197 23 618 A1 | 12/1997 | ............ G03F/1/14 |
| DE | d. 197 51 716 A1 | 5/1998 | ............ G02B/27/14 |
| DE | D. 198 46 532 C1 | 5/2000 | ............ G02B/27/09 |
| EP | 0 089 044 A2 | 9/1983 | ............ H01L/23/10 |
| EP | 0 261901 A2 | 3/1988 | ............ G09G/3/36 |
| EP | 0 314 437 A1 | 10/1988 | ............ H01L/25/08 |
| EP | 0 304 263 A2 | 2/1989 | .......... H01L/25/065 |
| EP | 0 306 308 A2 | 3/1989 | ............ H04N/3/14 |
| EP | 0 322 714 A2 | 7/1989 | ............ G02B/5/30 |
| EP | 0 627 644 A3 | 9/1990 | ............ G02B/27/00 |
| EP | 0 417 039 A1 | 3/1991 | ............ G03B/21/20 |
| EP | 0 423 513 A2 | 4/1991 | ............ H01S/3/085 |
| EP | 0 436 738 A1 | 7/1991 | ............ H04N/5/74 |
| EP | 0 458 316 A2 | 11/1991 | ............ G06K/11/06 |
| EP | 0 477 566 A2 | 4/1992 | ............ G02B/26/08 |
| EP | 0 488 326 A3 | 6/1992 | ............ G09G/3/28 |
| EP | 0 499 566 A2 | 8/1992 | ............ G06F/3/033 |
| EP | 0 528 646 A1 | 2/1993 | ............ G09G/3/02 |
| EP | 0 530 760 A2 | 3/1993 | ............ G09G/3/34 |
| EP | 0 550 189 A1 | 7/1993 | ............ G02F/1/315 |
| EP | 0 610 665 A1 | 8/1994 | ............ G09G/3/34 |
| EP | 0 627 644 A2 | 12/1994 | ............ G02B/27/00 |
| EP | 0 627 850 A1 | 12/1994 | ............ H04N/5/64 |
| EP | 0 643 314 A2 | 3/1995 | ............ G02B/27/00 |
| EP | 0 654 777 | 5/1995 | ............ G09G/3/34 |
| EP | 0 658 868 A1 | 6/1995 | ............ G09G/3/34 |
| EP | 0 685 830 A1 | 12/1995 | ............ G09G/3/34 |
| EP | 0 689 078 A1 | 12/1995 | ............ G02B/26/08 |
| EP | 0 801 319 A1 | 10/1997 | ............ G02B/26/00 |
| EP | 0 851 492 A2 | 7/1998 | ............ H01L/23/538 |
| EP | 1 003 071 A2 | 5/2000 | ............ G03B/27/72 |
| EP | 1 014 143 A1 | 6/2000 | ............ G02B/26/08 |
| EP | 1 040 927 A2 | 10/2000 | ............ B41J/2/455 |
| GB | 2 117 564 A | 10/1983 | ............ H01L/25/08 |
| GB | 2 118 365 A | 10/1983 | ............ H01L/27/13 |
| GB | 2 266 385 | 10/1993 | ............ G02B/23/10 |
| GB | 2 296 152 A | 6/1996 | ............ H04N/13/04 |
| GB | 2 319 424 A | 5/1998 | ............ H04N/13/04 |
| JP | 53-39068 | 4/1978 | ............ H01L/23/12 |
| JP | 55-111151 | 8/1980 | ............ H01L/27/00 |
| JP | 57-31166 | 2/1982 | ............ H01L/23/48 |
| JP | 57-210638 | 12/1982 | ............ H01L/21/60 |
| JP | 60-94756 | 5/1985 | ............ H01L/25/04 |
| JP | 60-250639 | 12/1985 | ............ H01L/21/58 |
| JP | 61-142750 | 6/1986 | ............ H01L/21/60 |
| JP | 61-145838 | 7/1986 | ............ H01L/21/60 |
| JP | 63-234767 | 9/1988 | ............ H04N/1/04 |
| JP | 63-305323 | 12/1988 | ............ G02F/1/13 |
| JP | 1-155637 | 6/1989 | ............ H01L/21/66 |
| JP | 40-1155637 | 6/1989 | ............ H01L/21/92 |
| JP | 2219092 | 8/1990 | ............ G09G/3/28 |
| JP | 4-333015 | 11/1992 | ............ G02B/27/18 |
| JP | 7-281161 | 10/1995 | ............ G02F/1/1333 |
| JP | 3288369 | 3/2002 | ............ G02B/26/06 |
| WO | WO 90/13913 | 11/1990 | ............ H01L/23/10 |
| WO | WO 92/12506 | 7/1992 | ............ G09F/9/37 |
| WO | WO 93/02269 | 2/1993 | ............ E06B/5/10 |
| WO | WO 93/09472 | 5/1993 | ............ G03F/7/20 |
| WO | WO 93/18428 | 9/1993 | ............ G02B/27/00 |
| WO | WO 93/22694 | 11/1993 | ............ G02B/5/18 |
| WO | WO 94/09473 | 4/1994 | ............ G09G/3/34 |
| WO | WO 94/29761 | 12/1994 | ............ G02B/27/24 |
| WO | WO 95/11473 | 4/1995 | ............ G02B/27/00 |
| WO | WO 96/02941 | 2/1996 | ............ H01L/23/02 |
| WO | WO 96/08031 | 3/1996 | ............ H01J/29/12 |
| WO | WO 96/41217 | 12/1996 | ............ G02B/5/18 |
| WO | WO 96/41224 | 12/1996 | ............ G02B/19/00 |
| WO | WO 97/22033 | 6/1997 | ............ G02B/27/22 |
| WO | WO 97/26569 | 7/1997 | ............ G02B/5/18 |
| WO | WO 98/05935 | 2/1998 | ............ G01L/9/06 |
| WO | WO 98/24240 | 6/1998 | ............ H04N/9/31 |
| WO | WO 98/41893 | 9/1998 | ............ G02B/26/08 |
| WO | WO 99/07146 | 2/1999 | ............ H04N/7/16 |
| WO | WO 99/12208 | 3/1999 | .......... H01L/25/065 |
| WO | WO 99/23520 | 5/1999 | ............ G02B/26/08 |

| | | | | |
|---|---|---|---|---|
| WO | WO 99/34484 | 7/1999 | | |
| WO | WO 99/59335 | 11/1999 | | H04N/5/765 |
| WO | WO 99/63388 | 12/1999 | | G02B/27/22 |
| WO | WO 99/67671 | 12/1999 | | G02B/26/08 |
| WO | WO 00/04718 | 1/2000 | | H04N/7/167 |
| WO | WO 00/07225 | 2/2000 | | H01L/21/00 |
| WO | WO 01/04674 A1 | 1/2001 | | G02B/6/12 |
| WO | WO 01/006297 A3 | 1/2001 | | G02B/27/10 |
| WO | WO 01/57581 A3 | 8/2001 | | G02B/27/48 |
| WO | WO 02/025348 A3 | 3/2002 | | G02B/26/02 |
| WO | WO 02/31575 A2 | 4/2002 | | G02B/27/00 |
| WO | WO 02/058111 A2 | 7/2002 | | |
| WO | WO 02/065184 A3 | 8/2002 | | G02B/27/12 |
| WO | WO 02/073286 A2 | 9/2002 | | G02B/26/08 |
| WO | WO 02/084375 A1 | 10/2002 | | G02B/26/08 |
| WO | WO 02/084397 A3 | 10/2002 | | G02B/27/18 |
| WO | WO 03/001281 A1 | 1/2003 | | G02F/1/01 |
| WO | WO 03/001716 A1 | 1/2003 | | H04J/14/02 |
| WO | WO 03/012523 A1 | 2/2003 | | G02B/26/00 |
| WO | WO 03/016965 A1 | 2/2003 | | G02B/5/18 |
| WO | WO 03/023849 A1 | 3/2003 | | H01L/23/02 |
| WO | WO 03/025628 A2 | 3/2003 | | |

OTHER PUBLICATIONS

O. Solgaard, "Integrated Semiconductor Light Modulators for Fiber–Optic and Display Applications", Ph.D. Dissertation, Stanford University Feb., 1992.
J. Neff, "Two–Dimensional Spatial Light Modulators: A Tutorial", Proceedings of the IEEE, vol. 78, No. 5 (May 1990), pp. 826–855.
R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.
R. Gerhard–Multhaupt, "Light–Valve Technologies for High–Definition Television Projection Displays", Displays vol. 12, No. 3/4 (1991), pp. 115–128.
O. Salgaard F. Sandejas, and D. Bloom, "Deformable Grating Optical Modulator," Optics Letters, vol. 17, No. 9, May 1, 1992, New York, USA, pp. 688–690.
F. Sandejas, R. W. Banyai, and D. Bloom, "Surface Microfabrication of Deformable Grating Valve for High Resolution Displays," The 7th International Conference on Solid–State Sensors and Actuators.
P. Alvelda, "High–Efficiency Color Microdisplays," SID 95 Digest, pp. 307–311, 1995.
Worboys et al., "Miniature Display Technology for Integrated Helmut Systems," GEC Journal of Research, vol. 10, No. 2, pp. 111–118, Chelmsford, Essex, GB 1993.
M. Farn et al., "Color Separation by use of Binary Optics," Optics Letters, vol. 18:15 pages 1214–1216, 1993.
P. Alvelda, "VLSI Microdisplays and Optoelectric Technology," MIT, pp. 1–93, 1995.
P. Alvelda, "VLSI Microdisplay Technology," Oct. 14, 1994.
D. Rowe, "Laser Beam Scanning," SPIE, vol. 2088, Oct. 5, 1993, 18–26.
L. Hornbeck, "Deformable–Mirror Spatial Light Modulators," Spatial Light Modulators and Applications III, Aug. 8, CA 1989, pp. 86–102.
Russick et al., "Supercritical Carbon Dioxide Extraction of Solvent from Micromachined Structures," Supercritical Fluids, Chapter 18, American Chemical Society, pp. 255–269, 1997.
Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.
R. Tepe, et al. "Viscoelastic Spatial Light Modulator with Active Matrix Addressing," Applied Optics, vol. 28, No. 22, New York, USA, pp. 4826–4834, Nov. 15, 1989.
W. Binder, et al., "Deformation Behavior of Thin Viscoelastic Layers Used in an Active–Matrix–Addressed Spatial Light Modulator," SPIE vol. 1018, pp. 79–83, Germany, 1988.
T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.
Burns, D.M. et al., *Development of microelectromechanical variable blaze gratings,* Sensors and Actuators A, pp. 7–15, 1998.
R.N. Thomas, et al., "The Mirror–Matrix Tube: A Novel Light Valve for Projection Displays", IEEE Transactions on Electron Devices, vol. ED–22, No. 9,pp. 765–775, Sep. 1975.
J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.
"Kitchen Computer", IBM Technical Disclosure Bulletin, vol. 37, No. 12, pp. 223–225, Dec. 1994.
"Image Orientation Sensing and Correction for Notepads", Research Disclosure, No. 34788, p. 217, Mar. 1993.
N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.
M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.
C. A. Turkatte, "Examining the Benefits of Tunable Lasers for Provisioning Bandwidth on Demand", EuroForum—Optical Components, Feb. 2001, pp. 1 of 10.
R. Plastow, "Tunable Lasers and Future Optical Networks", Forum—Tunable Laser, Aug. 2000, pp. 58 of 62.
Elizabeth Bruce, "Tunable Lasers", Communications, IEEE Spectrum, Feb. 2002, pp. 35 of 39.
M. G. Littman et al., "Spectrally Narrow Pulsed Dye Laser without Beam Expander", Applied Optics, vol. 17, No. 14, Jul. 15, 1978, pp. 2224 of 2227.
Apte et al., "Deformable Grating Light Valves for High Resolution Displays," Solid State Actuator Workshop, Hilton Head, South Carolina, Jun. 13–16, 1994.
Sene et al., "Polysilicon micromechanical grating for optical modulation," Sensors and Actuators, vol. A57, pp. 145–151, 1996.
Amm et al., "Invited Paper: Grating Light Valve™ Technology: Update and Novel Applications," SID Digest, vol. 29, 1998.
Development of Digital MEMS–Based Display Technology Promises Improved Resolution, Contrast and Speed, XP–000730009, 1997, pp. 33 of 34.
"Micromachined Opto/Electro/Mechanical Systems," Electronic Systems, NASA Tech Briefs, Mar. 1997, pp. 50 & 52.
S.T. Pai, et al., "Electromigration in Metals", Received Jun. 4, 1976, p. 103–115.

Olga B. Spahn, et al., "High Optical Power Handling of Pop–Up Microelecromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart of Electrical Engineering, 136–93 California Institute of Technology,1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamic of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminum Mirror," Physical Electronics Laboratory, 1991 IEEE pp. 547–550.

M. Parameswaran et al., "Commercial CMOS Fabricated Integrated Dynamic Thermal Scene Simulator," 1991 IEEE, pp. 29.4.1–29.44.

M. Parameswaran et al., "CMOS Electrothermal Microactuators," Depart of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M Vugts et al., "Si/XeF2 etching: Temperature dependence," 1996 American Vacuum Society, pp. 2766–2774.

P. Krummenacher et al. "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5,3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atorn reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "X3F2 and F–Atom Reactions with Si: Their Significance for Plasma Etching," Solid State Technology, V. 26, #4, Apr. 1983, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pages.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab. Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addision–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R. W. Corrigan et al., "Calibration of a Scanned Linear Grating Light–Valve, Projection System for E–Cinema Applications", Silicon Light Machine, SID'99, San Jose, CA, 27 pp. 1999.

R. W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/erpto/into.html, 35 pgs, Jun. 21, 1999.

"Deep Sky Black," Equinox Interscience, www.eisci.com/deepsky.html, 1997.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuit Conference, 1994.

Henck, S.A., "Lubrication of Digital Micromirror Devices™", Tribology Letters, No. 3, pp. 239–247, 1997.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in Al/Si$_3$N$_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photomic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

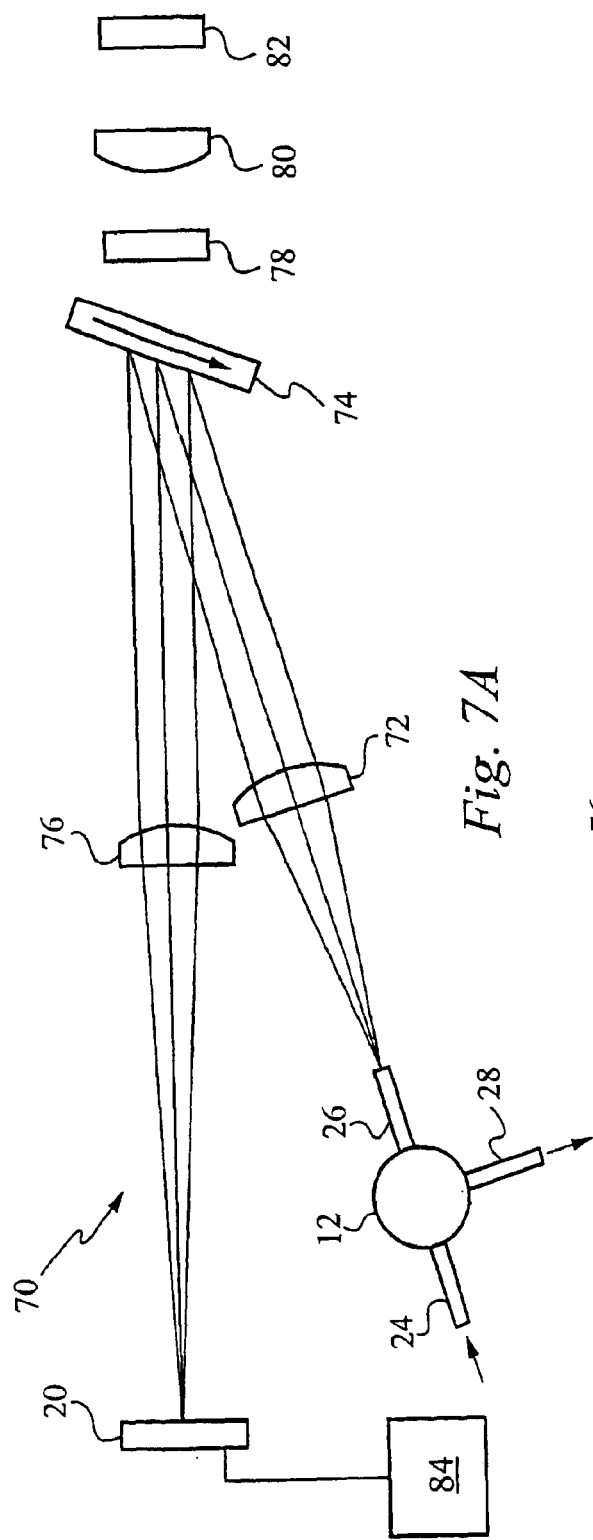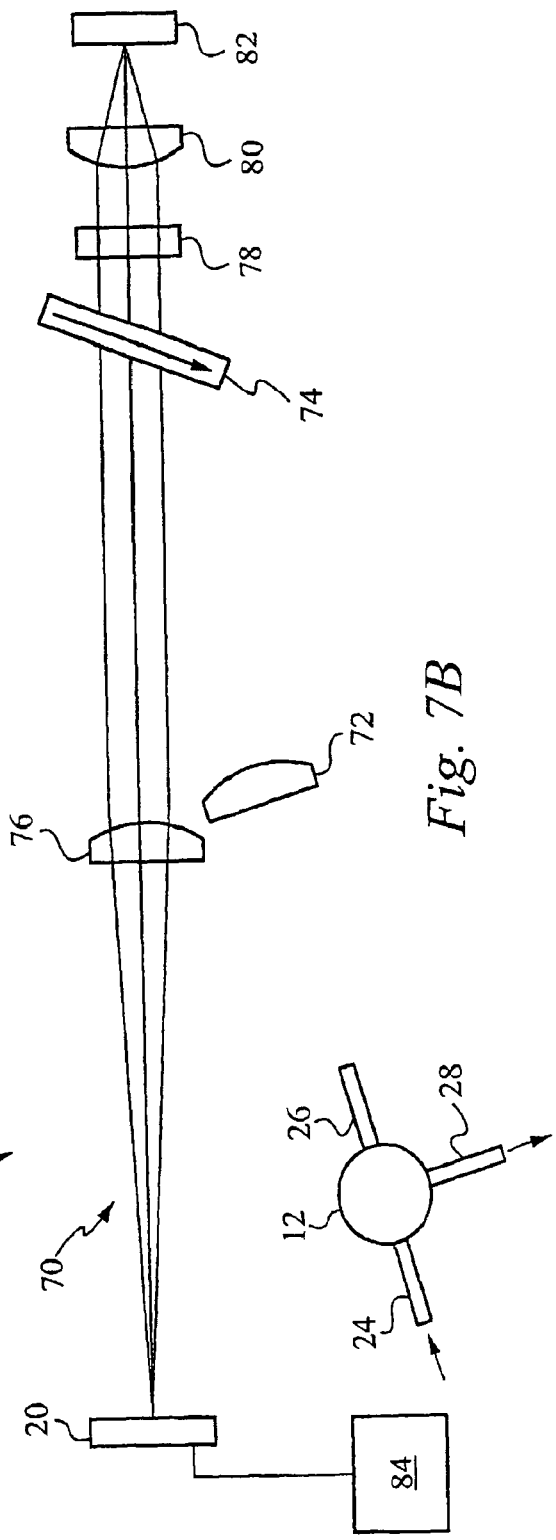

APPARATUS FOR SELECTIVELY BLOCKING WDM CHANNELS

FIELD OF THE INVENTION

This invention relates to the field of wavelength division multiplex (WDM) optical communication. More particularly, this invention relates to the field of wavelength division multiplex (WDM) optical communication where there is a need to selectively block at least one WDM channel.

BACKGROUND OF THE INVENTION

In WDM (wavelength division multiplex) optical communication, multiple wavelengths of light each carry a communication signal. Each of the multiple wavelengths of light forms a WDM channel. In DWDM (dense WDM) optical communication, a subset of the WDM optical communication, the WDM channels are spaced closer together. A typical DWDM application operates at a wavelength band about 1,550 mm, has 90 channels, and has spacing of 0.4 nm between adjacent channels.

In the WDM optical communication there is a need to selectively block at least one of the WDM channels. In order to block a WDM channel, a dynamic range between a blocked WDM channel and non-blocked WDM channels must be at least 30 dB. Preferably, the dynamic range between the blocked WDM channel and the non-blocked WDM channels must be at least 40 dB. There is also a need to selectively equalize a power level of each of the non-blocked WDM channels.

What is needed is a method of selectively blocking WDM channels, which is fast, which is cost efficient, and which reduces a power level of a blocked WDM channel by at least 30 dB.

SUMMARY OF THE INVENTION

An embodiment of the present invention is an apparatus for selectively blocking WDM channels. The apparatus for selectively blocking WDM channels comprises a light modulator, a diffraction grating, and a transform lens. The light modulator comprises an array of pixels. Each pixel of the light modulator is selectively operable to direct light into a first mode and a second mode. The first mode directs the light to an output. The second mode directs the light away from the output. The diffraction grating is operable to receive the WDM channels from an input and to disperse the WDM channels into a range of angles. The transform lens couples the diffraction grating to the light modulator. The diffraction grating is operable to transform the range of angles of the WDM channels into a range of spatially distinct positions along the array of pixels of the light modulator without overlap of two of the WDM channels on an individual pixel. In operation, the light modulator directs at least one of the WDM channels into the second mode while directing a remainder of the WDM channels into the first mode.

Embodiments of the present invention can also allow equalization of the non-blocked channels by utilizing a variable reflectivity of the light modulator to partially relect and partially diffract those non-blocked WDM channels which are to be equalized to a reference level.

BRIEF DESCRIPTION OF THE DRAWINGS

FIGS. 7A and 7B illustrate a second alternative selective blocking filter of the present invention.

DETAILED DESCRIPTION OF THE EMBODIMENTS

Embodiments of the present invention selectively block WDM (wavelength division multiplex) channels. In a WDM communication system, various wavelengths of light each carry information. The various wavelengths of light are referred to as WDM channels. The WDM channels are separated by a channel separation. For example, in a telecom C band having WDM channels from 1,527 to 1,563 nm with a channel separation of 0.4 run (or 50 GHz), 90 individual WDM channels each individually carry information. Applying the present invention to such a WDM communication system allows selective blocking of one or more of the 90 individual WDM channels.

Figure 1:
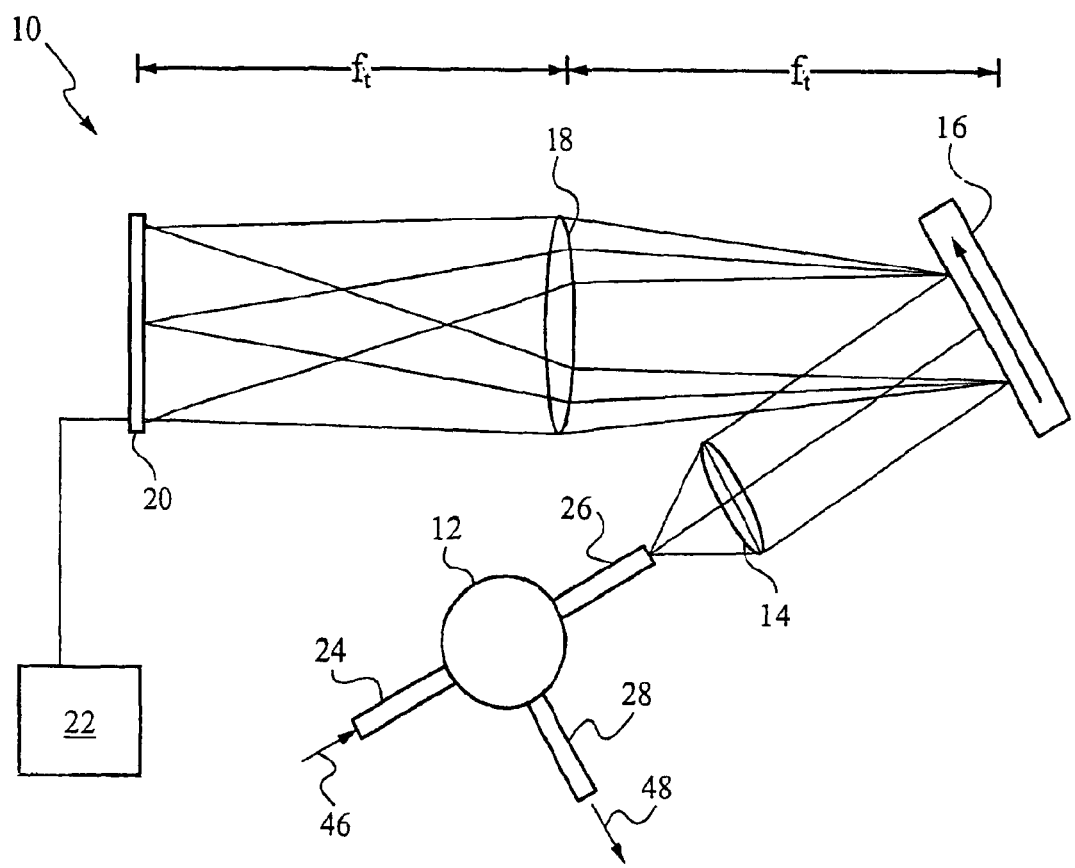
FIG. 1 illustrates the preferred selective blocking filter of the present invention.

The preferred selective blocking filter of the present invention is illustrated in FIG. 1. The preferred selective blocking filter 10 comprises a circulator 12, a first collimation lens 14, a first diffraction grating 16, a first transform lens 18, a grating light valve type device 20, and first electronics 22. The circulator 12 comprises an input optical fiber 24, a transceiver optical fiber 26, and an output optical fiber 28. The first collimation lens 14 couples the circulator 12 to the first diffraction grating 16. The first transform lens 18 couples the first diffraction grating 16 to the grating light valve type device 20. Preferably, a transform lens focal length $f_t$ separates the first diffraction grating 16 from the first transform lens 18. Preferably, the transform lens focal length $f_t$ separates the first transform lens 18 from the grating light valve type device 20. The first electronics 22 couple to the grating light valve type device 20.

Figure 2:
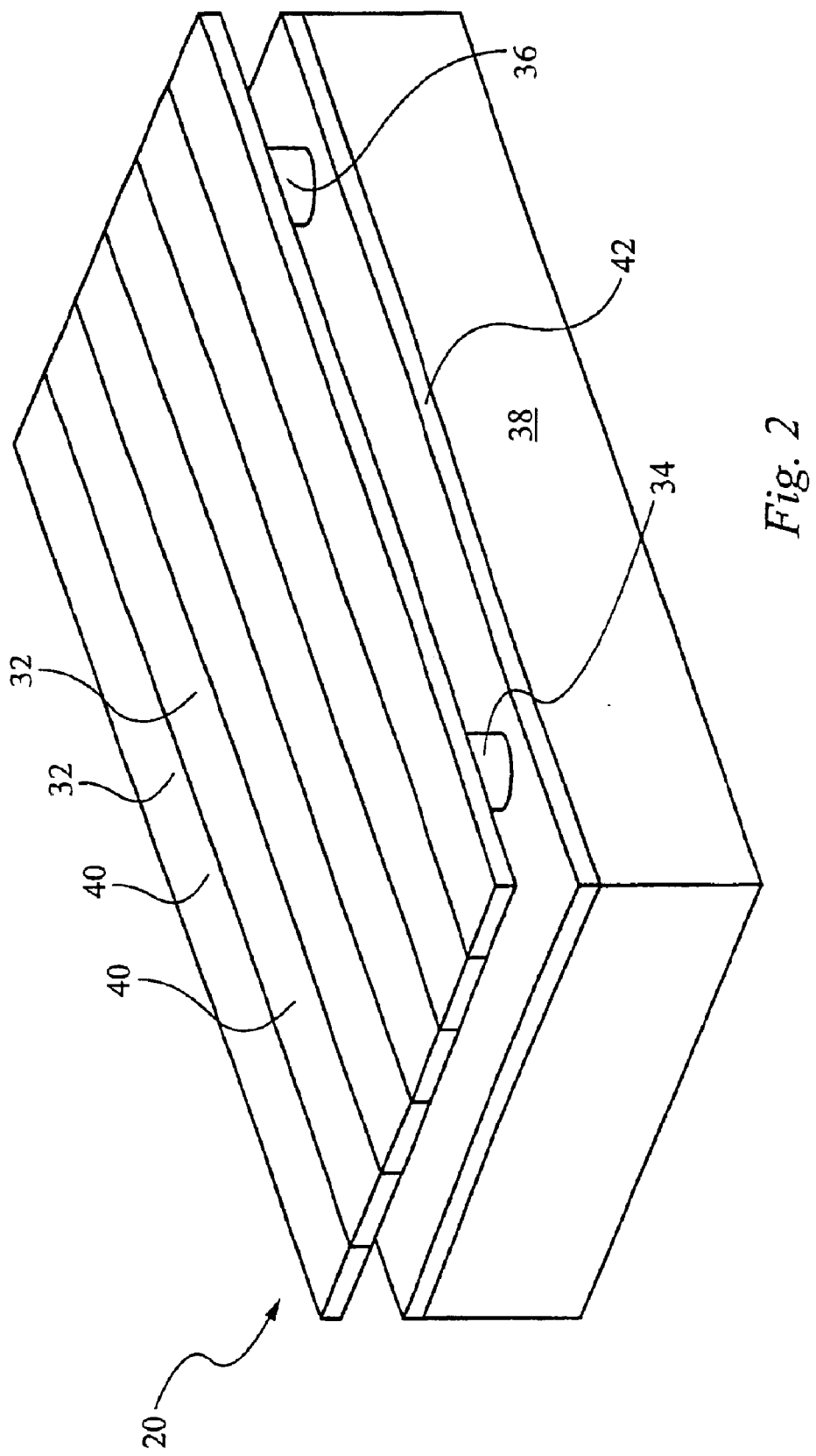
FIG. 2 illustrates a grating light valve type device of the present invention.

The grating light valve type device 20 of the present invention is illustrated in FIG. 2. The grating light valve type device 20 preferably comprises elongated elements 32 suspended by first and second posts, 34 and 36, above a substrate 38. The elongated elements 32 comprise a conducting and reflecting surface 40. The substrate 38 comprises a conductor 42. In operation, the grating light valve type device 20 operates to produce modulated light selected from a reflection mode and a diffraction mode.

Figure 3:
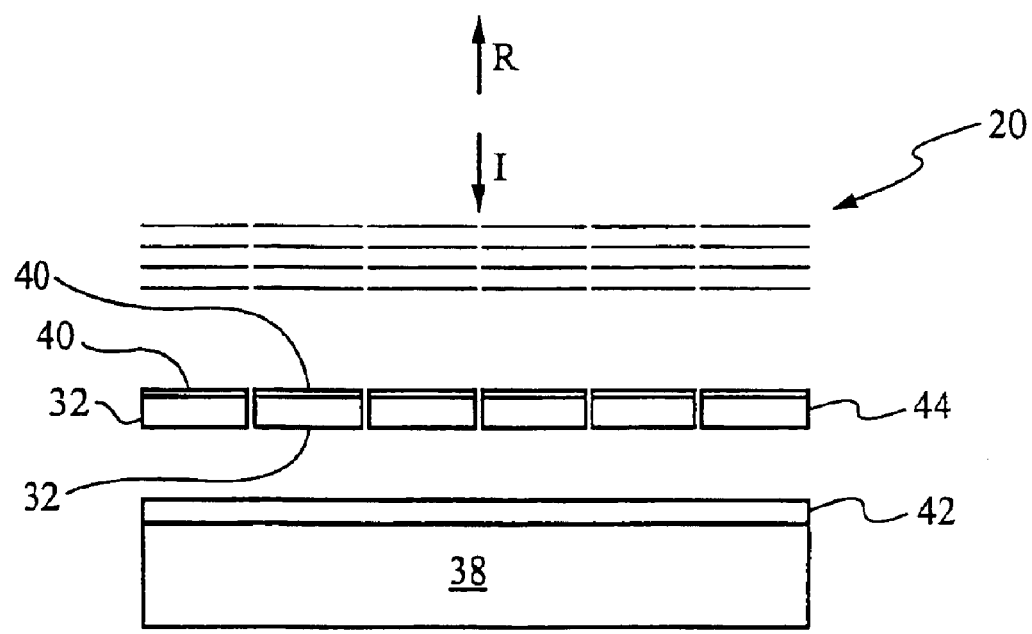
FIG. 3 illustrates the grating light valve type device of the present invention in a reflection mode.
Figure 4:
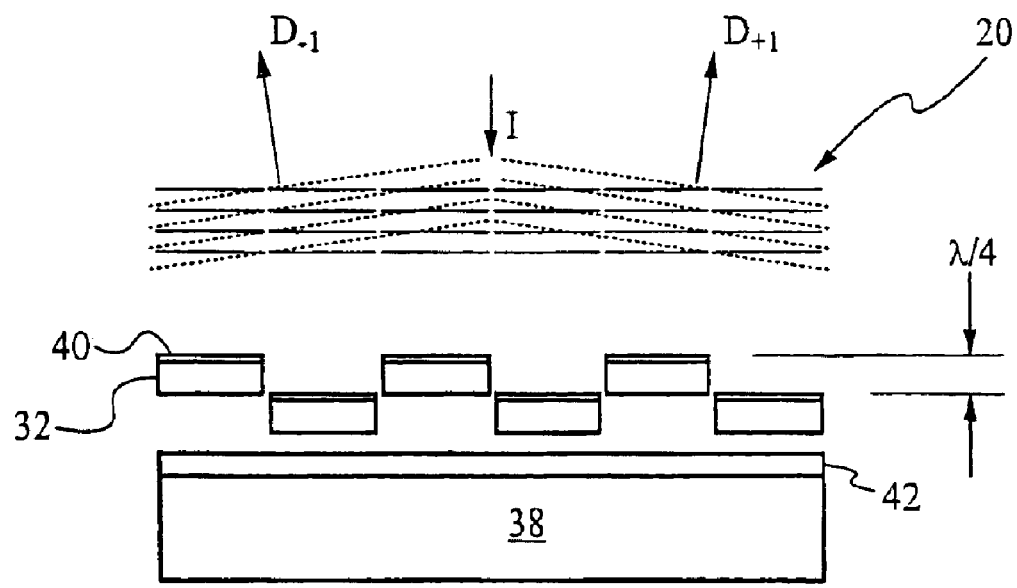
FIG. 4 illustrates the grating light valve type device of the present invention in a diffraction mode.

A cross-section of the grating light valve type device 20 of the present invention is further illustrated in FIGS. 3 and 4. The grating light valve type device 20 comprises the elongated elements 32 suspended above the substrate 38.

The elongated elements comprise the conducting and reflecting surface 40 and a resilient material 44. The substrate 38 comprises the conductor 42.

FIG. 3 depicts the grating light valve type device 20 in the reflection mode. In the reflection mode, the conducting and reflecting surfaces 40 of the elongated elements 32 form a plane so that incident light I reflects from the elongated elements 32 to produce reflected light R.

FIG. 4 depicts the grating light valve type device 20 in the diffraction mode. In the diffraction mode, an electrical bias causes alternate ones of the elongated elements 32 to move toward the substrate 38. The electrical bias is applied between the reflecting and conducting surfaces 40 of the alternate ones of the elongated elements 32 and the conductor 42. The electrical bias results in a height difference of a quarter wavelength $\lambda/4$ of the incident light I between the alternate ones of the elongated elements 32 and non-biased ones of the elongated elements 32. The height difference of the quarter wavelength $\lambda/4$ produces diffracted light including plus one and minus one diffraction orders, $D_{+1}$ and $D_{-1}$.

FIGS. 3 and 4 depict the grating light valve type device 20 in the reflection and diffraction modes, respectively. For a deflection of the alternate ones of the elongated elements 32 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements less than the quarter wavelength $\lambda/4$, the grating light valve type device 20 produces a variable reflectivity.

It will be readily apparent to one skilled in the art that the conducting and reflecting surface 40 can be replaced by a multilayer dielectric reflector and a conducting element where the conducting element is buried within each of the elongated elements 32 or within just the alternate ones of the elongated elements 32.

While FIGS. 2, 3, and 4 depict the grating light valve type device 20 having six of the elongated elements 32, the grating light valve type device 20 preferably includes more of the elongated elements 32. By providing more of the elongated elements 32, the elongated elements 32 are able to function as groups, which are referred to as pixels.

It will be readily apparent to one skilled in the art that the term "pixel" is used here in the context of an element of a light modulator rather than its more specific definition of a picture element of a display.

In operation of the preferred selective blocking filter 10 (FIG. 1), an input signal 46 comprising the WDM channels enters the input optical fiber 24 of the circulator 12 and exits the transceiver optical fiber 26. The first collimation lens 14 collimates the WDM channels. The first diffraction grating 16 disperses the WDM channels into a range of angles. The first transform lens 18 transforms the range of angles of the WDM channels into a range of spatially distinct positions along the grating light valve type device 20, which comprises an array of pixels. No two WDM channels on the grating light valve type device 20 overlap.

The grating light valve type device 20, driven by the first electronics 22, directs at least one of the WDM channels into the diffraction mode while directing a remainder of the WDM channels into the reflection mode. The reflection mode returns the remainder of the WDM channels along a reverse path to the transceiver optical fiber 26 of the circulator 12. The diffraction mode causes the at least one WDM channel to not follow the reverse path to the circulator 12. The reverse path comprises the first transform lens 18, the first diffraction grating 16, and the first collimation lens 14. The circulator 12 directs the remainder of the WDM channels out of the output optical fiber 28 of the circulator as an output signal 48.

In an alternative mode of operation, the function of the reflection mode and the diffraction mode can be exchanged. For example, the diffraction mode returns the remainder of the WDM channels along the reverse path to the transceiver optical fiber 26 of the circulator 12, and the reflection mode causes the at least one WDM channel to not follow the reverse path to the circulator 12.

In order to successfully achieve WDM channel blocking, a dynamic range between the at least one WDM channel and the remainder of the WDM channels at the output optical fiber 28 must be at least 30 dB. Preferably, the dynamic range between the at least one WDM channel and the remainder of the WDM channels at the output optical fiber 28 is at least 40 dB.

The dynamic range is met by first and second aspects of the present invention. The first aspect is not overlapping any two WDM channels on an individual pixel of the grating light valve type device 20 by spatially separating the WDM channels at distinct positions along the grating light valve type device 20. This is accomplished by using high resolution optical components for the first collimation lens 14, the first diffraction grating 16, and the first transform lens 18.

The second aspect is a modulator dynamic range provided by the grating light valve type device 20. In the reflection mode, the grating light valve type device 10 reflects the incident light I to form the reflected light R (FIG. 3). In the diffraction mode, the grating light valve type device 10 diffracts the incident light I to form the diffracted light including the plus one and minus one diffraction orders, $D_{+1}$ and $D_{-1}$ (FIG. 4). In the diffraction mode, however, a small amount of light is directed into the reflected mode. The modulator dynamic range is a ratio of a power level of the reflected light in the reflection mode to a power level of the small amount of reflected light in the diffraction mode. The grating light valve type device 20 has a modulator dynamic range that is at least 30 dB. By careful design and fabrication, including maintaining narrow gaps between the adjacent ones of the elongated elements 32 of the grating light valve type device 20, the grating light valve type device 20 provides a modulator dynamic range of 40 dB.

In an alternative operation of the preferred selective blocking filter 10, the remainder of the WDM channels are equalized to a reference level in addition to blocking the at least one WDM channel. The alternative operation utilizes the variable reflectivity capability of grating light valve type device 20 to partially reflect and partially diffract those WDM channels of the remainder of the WDM channels which must be reduced in power in order to equalize the remainder of the WDM channels to the reference level.

Figures 5, 6:
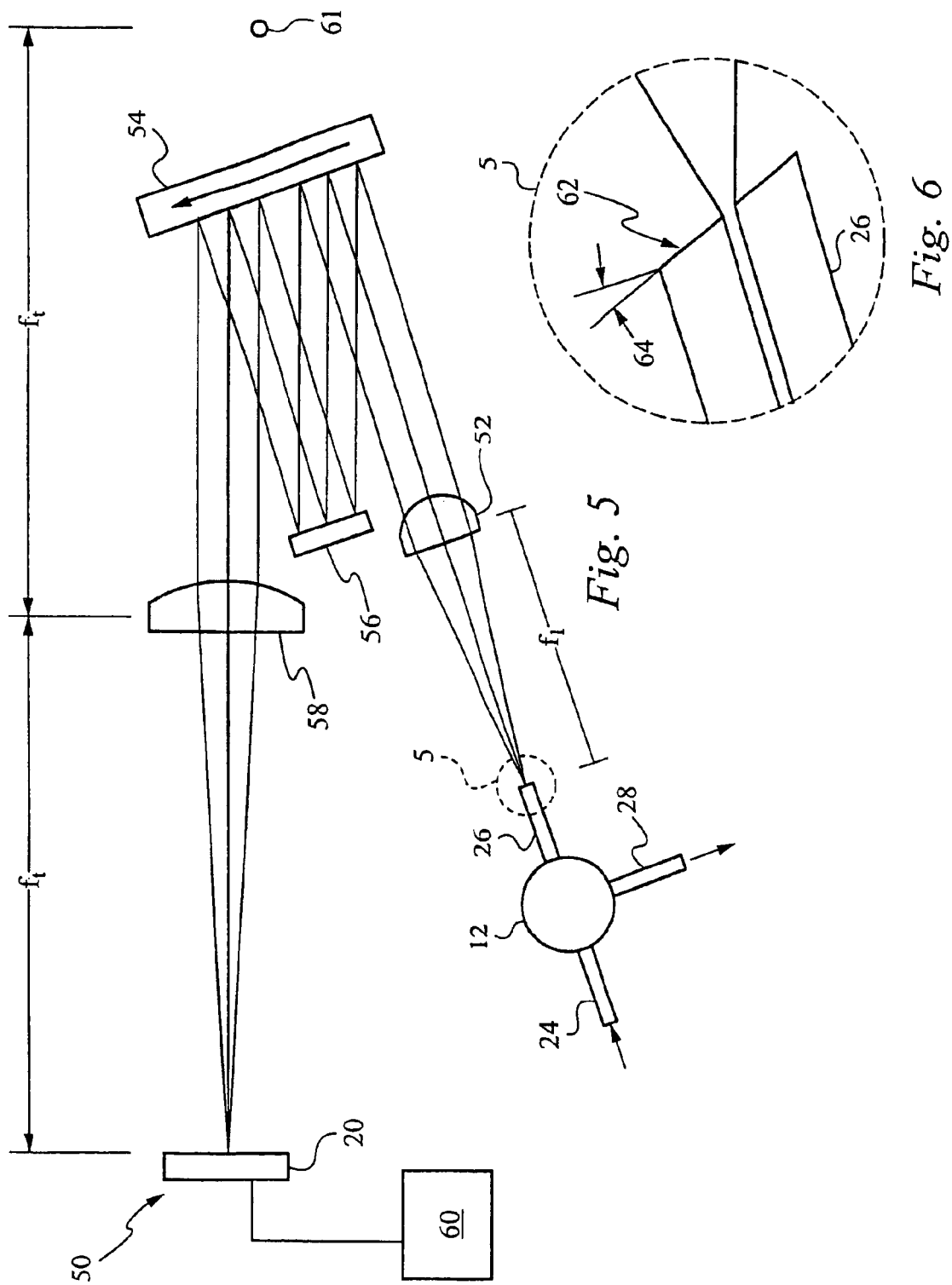
FIG. 5 illustrates a first alternative selective blocking filter of the present invention.
FIG. 6 illustrates an angled facet of a transceiver optical fiber of a circulator of the present invention.

A first alternative selective blocking filter of the present invention is illustrated in FIG. 5. The first alternative selective blocking filter 50 comprises the circulator 12, a second collimation lens 52, a second diffraction grating 54, a mirror 56, a second transform lens 58, the grating light valve type device 20, and second electronics 60. The second collimation lens 52 couples the circulator 12 to the diffraction grating 54. The diffraction grating 54 couples to the mirror 56. The second transform lens 58 couples the diffraction grating 54 to the grating light valve type device 20. Preferably, the transform lens 58 is positioned so that a virtual pivot 61 of the diffraction grating 54 is located at a transform lens focal length $f_t$. Preferably, the transform lens 58 is also positioned so that the grating light valve type device 20 is located at the transform lens focal length $f_t$. The second electronics 60 couple to the grating light valve type device 20.

In operation of the first alternative selective blocking filter 50, the circulator 12 directs the WDM channels to the collimation lens 52, which collimates the WDM channels onto the diffraction grating 54. The diffraction grating 54 disperses the WDM channels into a first range of angles. The mirror 56 reflects the first range of angles of the WDM channels back to the diffraction grating 54, which further disperses the WDM channels into a second range of angles. The transform lens 58 transforms the second range of angles of the WDM channels into spatially distinct positions along the grating light valve type device 20.

The grating light valve type device 20, driven by the second electronics 60, directs at least one of the WDM channels into the diffraction mode while directing a remainder of the WDM channels into the reflection mode. The reflection mode returns the remainder of the WDM channels along a second reverse path to the transceiver optical fiber 26 of the circulator 12. The diffraction mode causes the at least one WDM channel to not follow the second reverse path to the circulator 12. The second reverse path comprises the second transform lens 58, the second diffraction grating 54, the mirror 56, and the second collimation lens 52.

Comparing the first alternative selective blocking filter 50 to the preferred selective blocking filter 10 it is seen that the first alternative selective blocking filter 50 operates similarly to the preferred selective blocking filter 10 with first and second exceptions. The first exception is that the mirror 56 of the first alternative selective blocking filter causes a double pass of the WDM channels on the diffraction grating 54 before the WDM channels reach the grating light valve type device 20. The second exception is that the mirror 56 causes the double pass of the remainder of the WDM channels on the diffraction grating 54 along the second reverse path from the grating light valve type device 20 to the circulator 12. The double pass enhances the spatially distinct positions of the WDM channels along the grating light valve type device 20. This allows for a smaller physical layout for the first alternative selective blocking filter 50 over the preferred selective blocking filter 10. However, the first alternative selective blocking filter 50 incurs a slight loss in efficiency over the preferred selective blocking filter 10 due to the two reflections from the mirror 56 and due to the double pass of the second diffraction grating 54.

A fiber end of the transceiver optical fiber 26 of the circulator 12 is further illustrated in FIG. 6. The fiber end 62 of the transceiver optical fiber 26 preferably includes an angled facet having an angle 64 from a cross-cut of the transceiver optical fiber 26. The angle 64 reduces back reflection in the first alternative selective blocking filter 50, which enhances performance of the first alternative selective blocking filter 50. Preferably, the angle 64 is 8°, which provides a 3.6° beam deviation. Alternatively, the angle 64 is larger or smaller. Further alternatively, the angle 64 is zero.

A second alternative selective blocking filter of the present invention is illustrated in FIGS. 7A and 7B. The second alternative selective blocking filter 70 comprises the circulator 12, a third collimation lens 72, a third diffraction grating 74, a third transform lens 76, the grating light valve type device 20, a quarter wave plate 78, a retro lens 80, a retro mirror 82, and third electronics 84. The third collimation lens 72 couples the circulator 12 to the third diffraction grating 74. The third transform lens 76 couples the third diffraction grating 74 to the grating light valve type device 20. The third transform lens 76 also couples the grating light valve type device 20 the quarter wave plate 78. The retro lens 80 couples the quarter wave plate 78 to the retro mirror 82. The third electronics 84 couple to the grating light valve type device 20.

FIGS. 7A and 7B depict a plan view of the second alternative selective blocking filter 70 of the present invention. FIG. 7A depicts a first ray trace from the circulator 12 to the grating light valve type device 20. FIG. 7B depicts a second ray trace from the grating light valve type device 20 to the retro mirror 82.

It will be readily apparent to one skilled in the art that the third diffraction grating 74 lies in the first ray trace (FIG. 7A) and not the second ray trace (FIG. 7B).

In operation of the second alternative selective blocking filter 70, the WDM channels couple from the circulator 12 to the grating light valve type device 20 via the third collimation lens 72, the third diffraction grating 74, and the third transform lens 76 as depicted by the first ray trace in FIG. 7A. The grating light valve type device 20, driven by the third electronics 84, directs at least one of the WDM channels into the diffraction mode while directing the remainder of the WDM channels into the reflection mode. The remainder of the WDM channels are directed to the retro mirror 82 via the third transform lens 76, the quarter wave plate 78, and the retro lens 80 as depicted by the second ray trace in FIG. 7B. The retro mirror 82 reflects the remainder of the WDM channels back to grating light valve type device 20 via the retro lens 80, the quarter wave plate 78, and the third transform lens 76. The grating light valve type device 20 then directs the remainder of the WDM channels back to the circulator 12 via the third transform lens 76, the diffraction grating 74, and the third collimation lens 72.

The second alternative selective blocking filter 70 provides a double pass of the grating light valve type device 20. Because of the double pass of the grating light valve type device 20, the second alternative selective blocking filter 70 exhibits an ultrahigh attenuation of a blocked WDM channel.

Since the remainder of the WDM channels pass through the quarter wave plate 78 twice, the quarter wave plate 78 provides an orthogonal rotation of a polarization of the remainder of the WDM channels. This feature provides a mechanism for compensating for a polarization dependent loss in the second alternative selective blocking filter 70. By orienting an optic axis of the quarter wave plate 78 at 45° to the polarization that exhibits a worst polarization loss, the worst polarization loss is reduced by half.

Thus, advantages of the second alternative selective blocking filter 70 are that it exhibits the ultrahigh attenuation of the blocked WDM channel and it compensates for polarization dependent loss. A disadvantage of the second alternative selective blocking filter 70 is that it is less efficient due to the reflection from the retro mirror 82 and due to the double pass of the grating light valve type device 20.

Figure 8A:
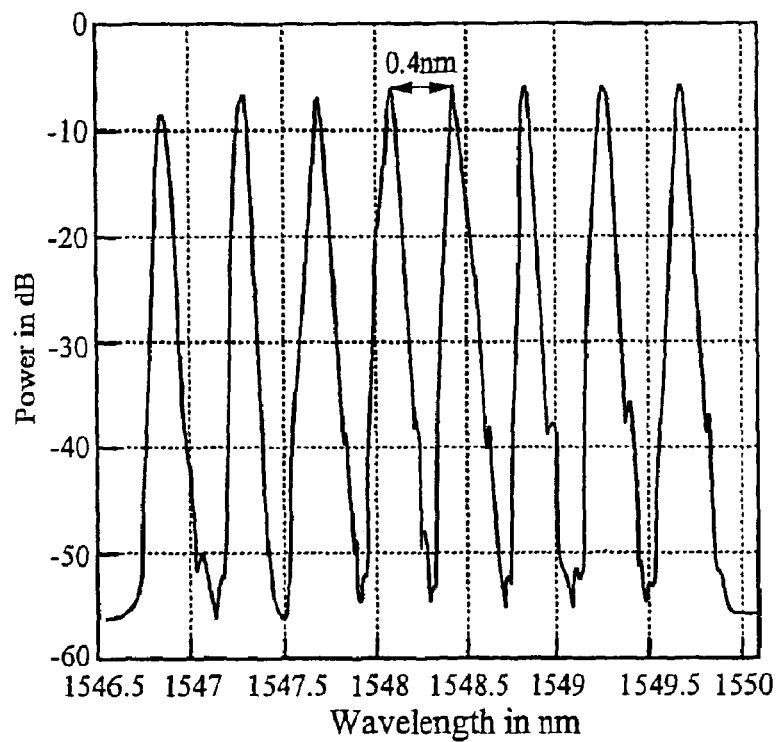
FIGS. 8A and 8B graphically illustrate test results from operation of the second alternative selective blocking filter of the present invention.
Figure 8B:
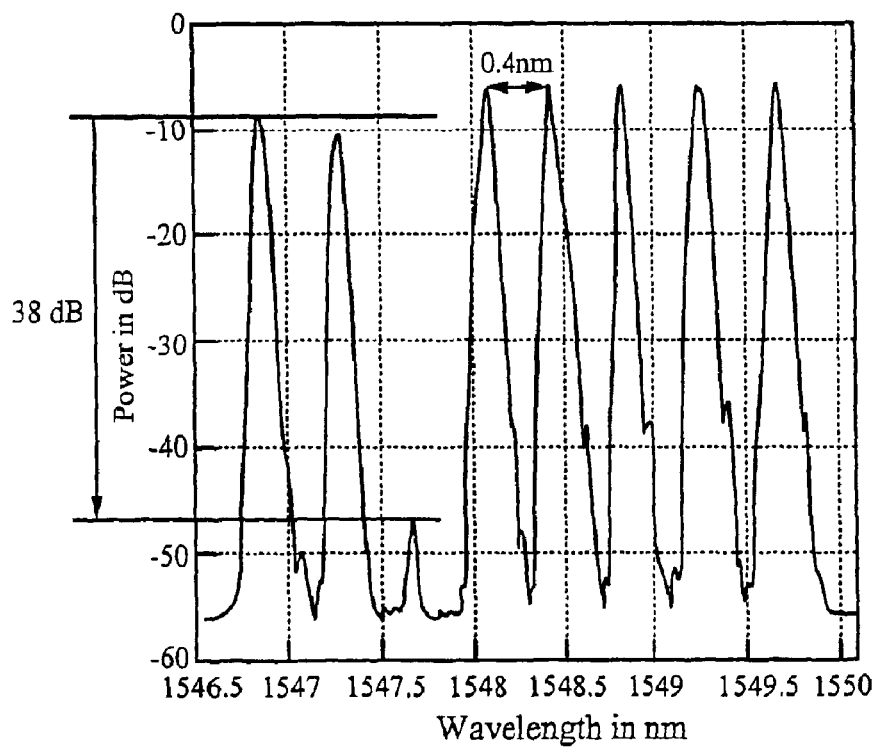

FIGS. 8A and 8B graphically illustrate test results from operation of the second alternative selective blocking filter 70 of the present invention. FIG. 8A graphically depicts the test results for a control test. In the control test, eight WDM channels on a channel spacing of 0.4 nm were passed through the second alternative selective blocking filter 70. In the control test, none of the eight WDM channels were blocked. FIG. 8B graphically depicts the test results for a blocking test. In the blocking test, a single WDM channel at 1547.72 nm was blocked while seven remaining WDM channels were transmitted. In the blocking test, the single WDM channel exhibited a power reduction of 38 dB.

Figure 9A:
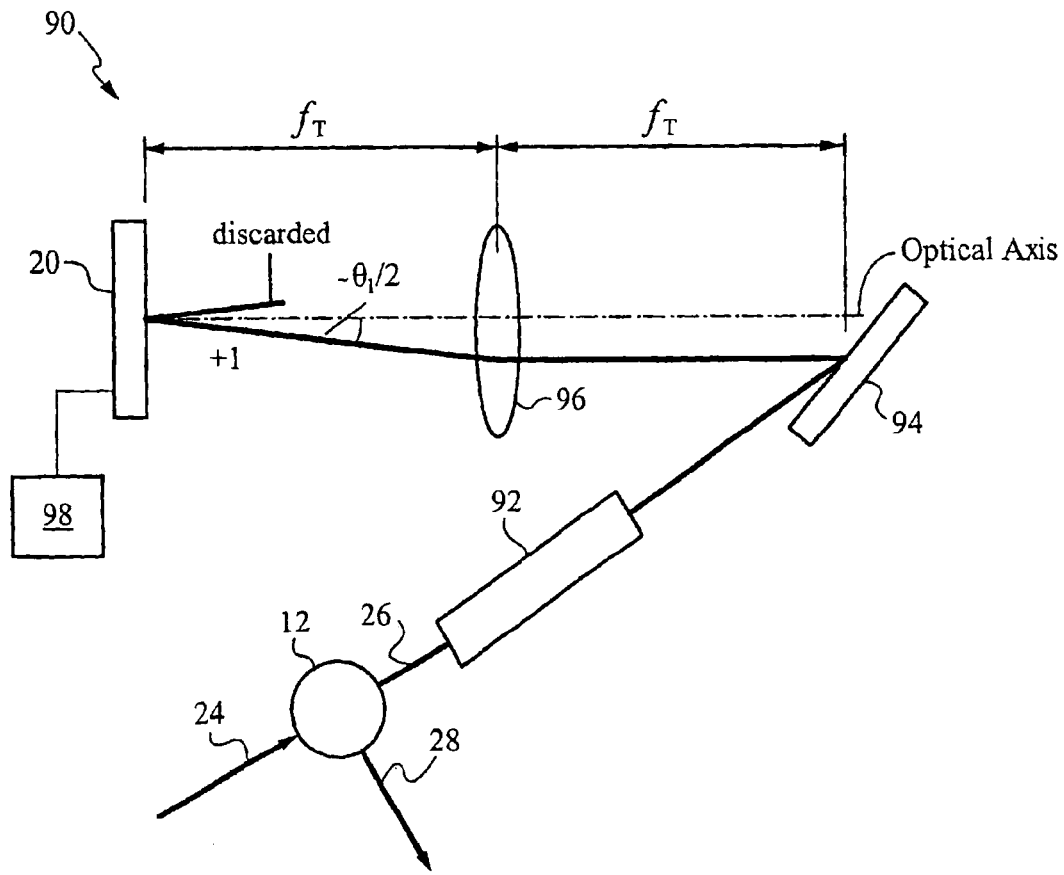
FIG. 9A illustrates a third alternative selective blocking filter of the present invention.

A third alternative selective blocking filter of the present invention is illustrated in FIG. 9A. The third alternative selective blocking filter 90 comprises the circulator 12, a polarization diversity (PD) module 92, a fourth diffraction grating 94, a fourth transform lens 96, the grating light valve type device 20, and fourth electronics 98. The PD module 92 couples the circulator 12 to the fourth diffraction grating 94. The fourth transform lens 96 couples the fourth diffraction grating 94 to the grating light valve type device 20. Preferably, a transform lens focal length ft separates the fourth diffraction grating 94 from the fourth transform lens 96. Preferably, the transform lens focal length $f_t$ separates the fourth transform lens 96 from the grating light valve type device 20. The fourth electronics 98 couple to the grating light valve type device 20. The grating light valve type device 20 is positioned perpendicular to the optical axis.

Figure 9C:
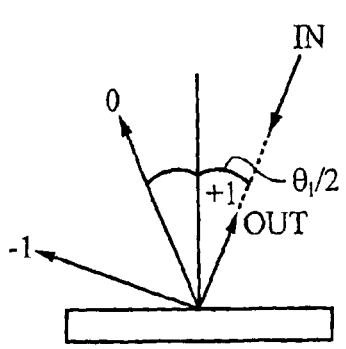
FIG. 9C illustrates a side view of the grating light valve type device operating in first order retro.
Figure 9B:
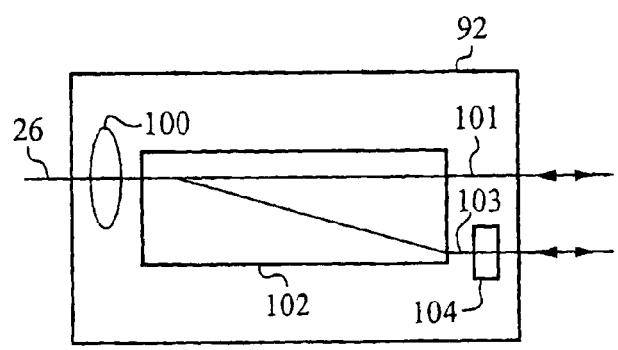
FIG. 9B illustrates the polarization diversity module included in the third alternative selective blocking filter.

FIG. 9B further illustrates the PD module 92. The PD module 92 comprises a fourth collimation lens 100, a polarization splitter 102 and a half-wave plate 104. The fourth collimation lens 100 couples the optical fiber 26 of the circulator 12 (FIG. 9A) to the polarization splitter 102. The half-wave plate 104 couples an optical path from the polarization splitter 102 to the fourth diffraction grating 94.

In operation of the third alternative selective blocking filter 90, the circulator 12 directs the WDM channels to the PD module 92. The WDM channels are received by the PD module 92 as diverging light beams from the optical fiber 26. The diverging light is received by the fourth collimation lens 100 and directed as collimated light to the polarization splitter 102. The polarization splitter 102 is preferably a crystal capable of splitting an input light beam into two light beams with orthogonal polarization states to each other. The polarization splitter 102 receives the collimated light from the fourth collimation lens 100 and splits the collimated light into a first split light 101 and a second split light 103. The first split light 101 and the second split light 103 are orthogonal to each other. Preferably, the first split light 101 is polarized perpendicular to the page of the FIG. 9B, and the second split light 103 is polarized parallel to the page of the FIG. 9B. The polarization of the first split light 101 is directed along an upper optical path and the second split light is directed along a lower optical path, as illustrated in FIG. 9B. The lower optical path is coupled to the half-wave plate 104 such that the half-wave plate 104 receives the second split light 103 from the polarization splitter 102. The half-wave plate 104 provides an orthogonal rotation of a polarization of the second split light 103. In this manner, the first split light 101 and the second split light 103 exit the PD module 92 with the same polarization.

The first split light 101 and the second split light 103 are coupled to the grating light valve type device 20 via the diffraction grating 94 and the fourth transform lens 96 as depicted by the optical path illustrated in FIG. 9A. Although two optical paths are illustrated leaving the PD module 92 in FIG. 9B, only one optical path is illustrated leaving the PD module 92 in FIG. 9A. This is because FIG. 9A shows a top down view of the PD module 92 relative to the view illustrated in FIG. 9B. As such, the two beams leaving the PD module 92 in FIG. 9B are stacked vertically, as viewed in FIG. 9A, and only one beam is shown. The first split light 101 and the second split light 103 in FIG. 9B, viewed as the single light beam in FIG. 9A, propagates from the diffractive grating 94 to the fourth transform lens 96 off-axis to the optical axis, and arrives off-center at the fourth transform lens 96. The beams are refracted by the transform lens 96 and directed onto the grating light valve type device 20 at an angle approximately one-half the first order diffraction angle.

The grating light valve type device 20, driven by the fourth electronics 98, directs at least one of the WDM channels into the diffraction mode while directing a remainder of the WDM channels into the reflection mode. Preferably, the third alternative selective blocking filter 90 uses first order retro operation of the grating light valve type device 20. FIG. 9C illustrates a side view of the grating light valve type device 20 operating in first order retro. As previously described in relation to the preferred, first alternative and second alternative selective blocking filters 10, 50, 70, an incident light impinges normal to the grating light valve type device 20 and first order diffracted light is diffracted at a first order diffraction angle $\theta_1$. In the third alternative selective blocking filter 90, incident light impinges the grating light valve type device 20 off-axis. Preferably, the incident light impinges the grating light valve type device 20 at an angle of about $\theta_1/2$. In first order retro operation, reflected light is reflected off-axis while the plus first order diffracted light is diffracted at an angle of about $\theta_1/2$. In other words, the plus first order diffracted light is diffracted at the same angle as the incident light impinging the grating light valve type device 20. In this third alternative embodiment, the incident light comprises the first split light 101 along the upper optical path and the second split light 103 along the lower optical path. In reference to FIG. 9C, the first split light 101 angles toward the grating light valve type device 20 from a position above the plane of FIG. 9C and in the plane of the incident light IN. Similarly, the second split light 103 angles toward the grating light valve type device 20 from a position below the plane of FIG. 9C and in the plane of the incident light IN. Preferably, the upper optical path and the lower optical path form mirror images of each other about the plane of the grating light valve type device 20 in FIG. 9C.

First split light 101 impinging the grating light valve type device 20 while in the diffraction mode is directed along a reverse path that comprises the lower optical path. In other words, the first split light 101 is directed to the grating light valve type device 20 along the upper optical path and, if the grating light valve type device 20 is in the diffraction mode, then the first split light 101 is directed away from the grating light valve type device 20 along the lower optical path. Similarly, second split light 103 impinging the grating light valve type device 20 while in the diffraction mode is directed along a reverse path that comprises the upper optical path. The reverse path along the upper optical path comprises the fourth transform lens 96, the fourth diffraction grating 94, the polarization splitter 102 and the fourth collimation lens 100. The reverse path along the lower optical path comprises the fourth transform lens 96, the fourth diffraction grating 94, the half-wave plate 104, the polarization splitter 102 and the fourth collimation lens 100. Once the second split light 103 returns through the half-wave plate 104, the first and second split light 101, 103 are orthogonal to each other. The polarization splitter 102 then recombines the first and second split light 101, 103 into an output signal. The output signal is directed to the optical fiber 26 via the fourth collimation lens 100.

The primary purpose of the polarization diversity module 92 is to suppress polarization dependent loss (PDL). Polarization diversity also enables the use of a highly dispersive grating and a fine pitch grating light valve type device, which both allow for a compact optics design. The PD module 92 can be fabricated reliably and economically.

In an alternative operation of the alternative selective blocking filters 50, 70 and 90, the remainder of the WDM channels are equalized to a reference level in addition to blocking the at least one WDM channel. The alternative operation utilizes the variable reflectivity capability of grating light valve type device 20 to partially reflect and partially diffract those WDM channels of the remainder of the WDM channels which must be reduced in power in order to equalize the remainder of the WDM channels to the reference level.

It will be readily apparent to one skilled in the art that other various modifications may be made to the embodiments without departing from the spirit and scope of the invention as defined by the appended claims.

What is claimed is:

1. An apparatus for selectively blocking WDM channels comprising:
    a light modulator comprising an array of pixels, each pixel selectively operable to direct light into a first mode and a second mode, the first mode directing the light to an output and the second mode directing the light away from the output, wherein the light modulator comprises a grating light valve type device, and wherein the first mode comprises a reflection mode and the second mode comprises a diffraction mode;
    a diffraction grating operable to receive the WDM channels from an input and to disperse the WDM channels into a range of angles;
    a transform lens coupled to the diffraction grating and operable to transform the range of angles of the WDM channels into a range of spatially distinct positions along the array of pixels without overlap of two of the WDM channels on an individual pixel such that in operation the light modulator directs at least one of the WDM channels into the second mode while directing a remainder of the WDM channels into the first mode;
    a collimation lens coupling the input to the diffraction grating; and
    a mirror coupled to the diffraction grating such that in operation the diffraction grating disperses the WDM channels into the range of angles in a first pass of the diffraction grating and further such that in operation the mirror returns the WDM channels to the diffraction grating where the WDM channels are further dispersed by the diffraction grating in a second pass of the diffraction grating before the WDM channels reach the grating light valve type device,
    wherein the input comprises an optical fiber coupled to a circulator, and
    wherein the output comprises a reverse path from the grating light valve type device to the circulator via the transform lens, the diffraction grating, and the collimation lens.

2. An apparatus for selectively blocking WDM channels comprising:
    a light modulator comprising an array of pixels, each pixel selectively operable to direct light into a first mode and a second mode, the first mode directing the light to an output and the second mode directing the light away from the output, wherein the light modulator comprises a grating light valve type device, and wherein the first mode comprises a reflection mode and the second mode comprises a diffraction mode;
    a diffraction grating operable to receive the WDM channels from an input and to disperse the WDM channels into a range of angles;
    a transform lens coupled to the diffraction grating and operable to transform the range of angles of the WDM channels into a range of spatially distinct positions along the array of pixels without overlap of two of the WDM channels on an individual pixel such that in operation the light modulator directs at least one of the WDM channels into the second mode while directing a remainder of the WDM channels into the first mode;
    a collimation lens coupling the input to the diffraction grating; and
    a retro mirror coupled to the grating light valve type device such that in operation the grating light valve type device directs the remainder of the WDM channels to the retro mirror in a first pass of the grating light valve type device and further such that in operation the retro mirror causes the remainder of the WDM channels to return to the grating light valve type device in a second pass of the grating light valve type device before reaching the output; and
    a retro lens coupling the retro mirror to the grating light valve type device,
    wherein the input comprises an optical fiber coupled to a circulator.

3. The apparatus of claim 2 further comprising a quarter wave plate coupling the retro lens to the grating light valve type device, the quarter wave plate causing an orthogonal rotation of a polarization between the first pass of the grating light valve type device and the second pass of the grating light valve type device.

4. The apparatus of claim 2 wherein a modulator dynamic range between the first and second modes comprises at least 30 dB.

5. The apparatus of claim 2 wherein a modulator dynamic range between the first and second modes comprises at least 40 dB.

6. An apparatus for selectively blocking WDM channels comprising:
    a light modulator comprising an array of pixels, each pixel selectively operable to direct light into a first mode and a second mode, the first mode directing the light to an output and the second mode directing the light away from the output, wherein the light modulator comprises a grating light valve type device, and wherein the first mode comprises a reflection mode and the second mode comprises a diffraction mode;
    a diffraction grating operable to receive the WDM channels from an input and to disperse the WDM channels into a range of angles;
    a transform lens coupled to the diffraction qrating and operable to transform the range of angles of the WDM channels into a range of spatially distinct positions along the array of pixels without overlap of two of the WDM channels on an individual pixel such that in operation the light modulator directs at least one of the WDM channels into the second mode while directing a remainder of the WDM channels into the first mode;
    a collimation lens coupling the input to the diffraction grating; and
    a polarization diversity module coupling the input to the diffraction grating, the polarization diversity module including a half-wave plate for rotating a polarization of the WDM channels, wherein the input comprises an optical fiber coupled to a circulator.

7. An apparatus for selectively blocking WDM channels comprising:
   a diffractive light modulator comprising an array of pixels, each pixel selectively operable to direct light into a first mode and a second mode, the first mode directing the light to an output and the second mode directing the light away from the output, wherein a dynamic range between the first and second modes comprises at least 30 dB;
   a circulator comprising an input optical fiber, a transceiver optical fiber, and an output optical fiber, the input optical fiber operable to receive the WDM channels from an optical network, the circulator operable to direct the WDM channels to the transceiver optical fiber;
   a collimation lens coupled to the transceiver optical fiber, the collimation lens operable to collimate the WDM channels;
   a diffraction grating operable to receive the WDM channels from the collimation lens and to disperse the WDM channels into a range of angles;
   a transform lens coupled to the diffraction grating and operable to transform the range of angles of the WDM channels into a range of spatially distinct positions along the array of pixels without overlap of two of the WDM channels on an individual pixel such that in operation the light modulator directs at least one of the WDM channels into the second mode while directing a remainder of the WDM channels into the first mode; and
   a mirror coupled to the diffraction grating, the mirror operable to reflect the range of angles of the WDM channels back to the diffraction grating, the diffraction grating operable to further disperse the range of angles of the WDM channels before the WDM channels reach the diffractive light modulator.

8. The apparatus of claim 7 wherein a modulator dynamic range between the first and second modes comprises at least 30 dB.

9. The apparatus of claim 7 wherein a modulator dynamic range between the first and second modes comprises at least 40 dB.

* * * * *